(12) United States Patent
Orofino, II et al.

(10) Patent No.: US 9,262,141 B1
(45) Date of Patent: Feb. 16, 2016

(54) DISTRIBUTED COMPUTATIONS OF GRAPHICAL PROGRAMS HAVING A PATTERN

(75) Inventors: Donald Paul Orofino, II, Sudbury, MA (US); Ramamurthy Mani, Wayland, MA (US); Michael James Longfritz, Waltham, MA (US)

(73) Assignee: The MathWorks, Inc., Natick, MA (US)

( * ) Notice: Subject to any disclaimer, the term of this patent is extended or adjusted under 35 U.S.C. 154(b) by 1854 days.

(21) Appl. No.: 11/900,295

(22) Filed: Sep. 10, 2007

Related U.S. Application Data (60) Provisional application No. 60/843,095, filed on Sep. 8, 2006.

(51) Int. Cl.
G06F 9/44 (2006.01)
G06F 9/45 (2006.01)
G06F 9/50 (2006.01)

(52) U.S. Cl.
CPC .. *G06F 8/45* (2013.01); *G06F 8/34* (2013.01); *G06F 9/5066* (2013.01)

(58) Field of Classification Search
None
See application file for complete search history.

(56) References Cited

U.S. PATENT DOCUMENTS

| | | | | |
|---|---|---|---|---|
| 6,243,863 B1* | 6/2001 | Kothari et al. | | 717/149 |
| 6,608,638 B1* | 8/2003 | Kodosky et al. | | 715/771 |
| 6,931,638 B2* | 8/2005 | Daynes et al. | | 718/1 |
| 6,971,084 B2* | 11/2005 | Grey et al. | | 717/106 |
| 7,340,684 B2* | 3/2008 | Ramamoorthy et al. | | 715/763 |
| 7,509,244 B1* | 3/2009 | Shakeri | G06F 9/5044 | 703/13 |
| 7,603,656 B2* | 10/2009 | Kuo et al. | | 717/108 |
| 7,703,034 B2* | 4/2010 | Kornerup et al. | | 715/772 |
| 8,037,464 B2* | 10/2011 | Eichenberger et al. | | 717/151 |
| 8,726,232 B1* | 5/2014 | Carrick | G06F 8/36 | 703/13 |
| 2003/0005180 A1* | 1/2003 | Schmit et al. | | 709/328 |
| 2004/0090439 A1* | 5/2004 | Dillner | G06K 9/00402 | 345/440 |
| 2005/0034106 A1* | 2/2005 | Kornerup et al. | | 717/132 |
| 2005/0091602 A1* | 4/2005 | Ramamoorthy et al. | | 715/763 |
| 2005/0096894 A1* | 5/2005 | Szpak et al. | | 703/13 |
| 2006/0031664 A1* | 2/2006 | Wilson et al. | | 713/1 |
| 2006/0136878 A1* | 6/2006 | Raghunath et al. | | 717/130 |
| 2006/0161882 A1* | 7/2006 | Kuo et al. | | 717/104 |
| 2007/0044073 A1* | 2/2007 | Kornerup et al. | | 717/113 |
| 2008/0052687 A1* | 2/2008 | Gonzales-Tuchmann et al. | | 717/140 |

OTHER PUBLICATIONS

Kessler, C., et al., Automatic Parallelization by Pattern Matching, Lecture Notes in Computer Science [online], 1993 [retrieved May 27, 2011], Retrieved from Internet: <http://www.springerlink.com/content/phtl0n0122212247/fulltext.pdf>, pp. 166-181.*

(Continued)

*Primary Examiner* — Todd Aguilera
(74) *Attorney, Agent, or Firm* — Cesari and McKenna, LLP; Michael R. Reinemann (57) ABSTRACT

In one embodiment, a computer-implemented method for concurrently processing at least a portion of a graphical model is provided. The method may include obtaining the graphical model; recognizing a pattern in the graphical model, the pattern suitable for concurrent processing; and employing concurrent processing using multi-thread, multi-core, or multi-processor computing device when executing the pattern in the graphical model.

28 Claims, 9 Drawing Sheets

(56) References Cited

OTHER PUBLICATIONS

Di Martino, B., et al., Automatic Detection of Interaction Pattern for Parallel Program Analysis and Development, Proceedings of the 6th International Workshop on Program Comprehension [online], 1998 [retrieved May 27, 2011], Retrieved from Internet: <http://ieeexplore.ieee.org/xpls/abs_all.jsp?arnumber=693361&tag=1>, pp. 1-8.*

Bacci, B., et al., SkIE: a Heterogeneous Environment for HPC Applications, Parallel Computing [online], 1999 [retrieved May 27, 2011], Retrieved from Internet: <http://www.sciencedirect.com/science/article/pii/S0167819199000721>, pp. 1-29.*

Motorola Semiconductor Product Sector, RapidlO: An Embedded System Component Network Architecture [online], 2000 [retrieved May 27, 2011], Retrieved from Internet: <http://citeseerx.ist.psu.edu/viewdoc/download?doi=10.1.1.93.4945&rep=rep1&type=pdf>, pp. 1-25.*

Li, J., et al., "Compiling Communication-Efficient Programs for Massively Parallel Machines," IEEE Transactions on Parallel and Distributed Systems [online], vol. 2, No. 3, 1991 [retrieved Jun. 29, 2013], Retrieved from Internet <http://ieeexplore.ieee.org/stamp/stamp.jsp?tp=&arnumber=86111>, pp. 361-376.*

Toyoda, M., et al., "Supporting Design Patterns in a Visual Parallel Data-Flow Programming Environment," Proceedings of the 1997 IEEE Symposium on Visual Languages [online], 1997 [retrieved Jun. 29, 2013], Retrieved from Internet: <http://ieeexplore.ieee.org/stamp/stamp.jsp?tp=&arnumber=626561>, pp. 76-83.*

Siu S., et al., "Design Patterns for Parallel Programming", Proceedings of the 1996 International Conference on Parallel and Distributed Processing Techniques [online], 1996 [retrieved Jan. 2, 2014], Retrieved from Internet: <http://www.rrsg.ee.uctac.za/courses/EEE4084F/Reading/Siu+Design+Patterns+for+Parallel+Programming.pdf>, pp. 1-11.*

Di MArtino, B., et al., "Algorithmic Concept Recognition Support for Skelton Based Parallel Programming," Proceedings of the 2003 International Parallel and Distributed Processing Symposium [online], 2003 [retrieved Mar. 16, 2015], Retrieved from Internet: <URL: ftp://ftp.cs.umanitoba.ca/pub/IPDPS03/DATA/W03_HIPS_09.PDF>, pp. 1-10.*

Kessler, C., "Pattern-Driven Automatic Parallelization" Scientific Programming [online], vol. 5, No. 3, 1996 [retrieved Mar. 16, 2015], Retrieved from Internet: <URL: http://www.hindawi.com/journals/sp/1996/406379/abs/>, pp. 251-274.*

Di Martino, B., et al., "Two Program Comprehension Tools for Automatic Parallelization", IEEE Concurrency, vol. 8, No. 1, 2000 [retrieved Sep. 18, 2015], Retrieved From Internet: <URL: http://ieeexplore.ieee.org/stamp/stamp.jsp?tp=&arnumber=824311>, pp. 37-47.*

Hagemeister, J.R., et al. "Implementation of a Pattern-Matching Approach for Identifying Algorithmic Concepts in Scientific FORTRAN Programs", Proceedings of the $3^{rd}$ Int'l Conf. on High Perf. Computing [online], 1996 [retreived Sep. 18, 2015], Retrieved from Internet: <URL: http://ieeexplore.ieee.org/xpls/abs_all.jsp?arnumber=565825>, pp. 209-214.*

* cited by examiner

DISTRIBUTED COMPUTATIONS OF GRAPHICAL PROGRAMS HAVING A PATTERN

RELATED APPLICATION

The present application claims the benefit of U.S. Provisional Patent Application No. 60/843,095 filed on Sep. 8, 2006, the content of which is incorporated by reference in its entirety.

BACKGROUND

Techniques, such as graphical analysis and simulation may be used in modeling, design, analysis, and/or synthesis of engineered systems. These techniques may provide various classes of graphical models to describe computations that can be performed on application specific or general purpose computational hardware, such as a computer, microcontroller, field-programmable gate array (FPGA), or custom hardware. Classes of such graphical models may include time-based block diagrams, state-based and flow diagrams, entity flow network diagrams, and/or data-flow diagrams. A common characteristic among these various classes of graphical models is that they can define semantics that determine how a diagram is executed.

Graphical modeling has spawned a variety of software products that cater to various aspects of dynamic system analysis and design. Such products allow users to perform various types of tasks including constructing system models through a user-interface that allows drafting graphical models, allowing augmentation of a pre-defined set of blocks used in block diagrams with users' custom-built blocks, using the graphical model to compute and trace the temporal evolution of the dynamic system's outputs ("executing" the graphical model), and automatically producing either deployable software systems or descriptions of hardware systems that mimic the behavior of either the entire model or portions of it.

SUMMARY OF EXEMPLARY IMPLEMENTATIONS

In one embodiment, a computer-implemented method for concurrently processing at least a portion of a graphical model is provided. The method may include obtaining the graphical model; recognizing a pattern in the graphical model that is suitable for concurrent processing; and employing concurrent processing using a multi-threaded, multi-core, or multi-processor computing device when executing the pattern in the graphical model.

In another embodiment, a system for concurrently processing at least a portion of a graphical model is provided. The system includes a pattern recognizer that recognizes a pattern in the graphical model. The pattern is suitable for concurrent processing. The system also includes a pattern partitioner that partitions the recognized pattern into a specified number of partitions for concurrent processing. Each partition is executed by a different thread, a different core, or a different computing resource.

In still another embodiment, a medium storing computer-executable instructions for causing concurrent processing at least a portion of a graphical model is provided. The instructions include instructions for obtaining the graphical model, instructions for recognizing a pattern in the graphical model, wherein the pattern is suitable for concurrent processing, and instructions for employing concurrent processing using a multi-threaded, multi-core, multi-processor, or a combination thereof in executing the pattern in the graphical model.

In yet another embodiment, a computer-implemented method for concurrent processing at least a portion of a graphical model is provided. The method includes obtaining the graphical model, recognizing a pattern in the graphical model, wherein the pattern is suitable for concurrent processing, and designating the pattern for concurrent execution.

BRIEF DESCRIPTION OF THE FIGURES

The foregoing and other objects, aspects, features, and advantages will become more apparent and may be better understood by referring to the following description taken in conjunction with the accompanying drawings, in which.

DETAILED DESCRIPTION

The complexity of systems modeled in a modeling environment may necessitate the deployment of the automatically-produced software and hardware descriptions onto hardware platforms that contain more than one resource capable of performing computational processing. Such resources can range from multiple threads running on a single processor to multiprocessor platforms. A multiprocessor system is one in which two or more central processing units (CPUs) are installed in a single package such as within a single integrated circuit package or a single printed circuit board (PCB). A multiprocessor system is capable of allocating computing tasks amongst the multiple CPUs in the system. The term multiprocessing is used to mean that a multiprocessing system is capable of processing multiple tasks in a concurrent fashion. Multiprocessor systems are further classified as tightly coupled or loosely coupled depending on the bandwidth of the communication which is supported amongst the CPUs in the system. For example, tightly coupled processors are those which are connected through a high bandwidth bus. For example, a loosely couple multiprocessing system is a system of N processors which are connected through a lower bandwidth Ethernet network connection. A multicore platform is a tightly coupled multiprocessor system in which the CPUs in the system are packaged into a single integrated circuit.

The multiple computational resources on the hardware platform may allow the deployment of complex systems in which computations can be performed in a concurrent manner on these resources.

Additionally, with many engineering and scientific problems requiring larger and more complex modeling, computations become more resource intensive and time-consuming. However, a single computational processor can be limiting to the size of the problem that can be solved in a reasonable amount of time, because of the relationship of the computing power of the workstation to the computing power necessary to execute computing intensive iterative processing of complex problems in a reasonable amount of time. For example, a simulation of a large complex aircraft model may take a reasonable amount of time to run with a single workstation with a specified set of parameters. However, the analysis of the problem may also require the model to be executed multiple times with a different set of parameters, e.g., for an aeronautical model, the model may need to be executed at one-hundred different altitude levels and fifty different aircraft weights, to understand the behavior of the model under varied conditions. This example requires five-thousand computations of the model to analyze the problem, and the single workstation takes an unreasonable amount of time to perform these computations. Therefore, it may be desirable to perform executions using multiple computing resources when the computation becomes so large and complex that it cannot be completed in a reasonable amount of time on a single workstation. In addition, it may be desirable to perform executions using multiple computing resources when executing a single model on a single workstation would take too long.

Exemplary embodiments may provide devices and/or techniques for deploying portions of a graphical model on a hardware platform that supports concurrent processing. Exemplary embodiments may also concurrently simulate at least a portion of a graphical model. A portion of a graphical model may be identified and compared to predetermined patterns that are suitable for concurrent simulation or deployment. If the portion matches one of the patterns, the portion may be concurrently processed. Concurrent is used herein to mean simultaneous execution of two or more computations, partly or fully overlapped in time. Concurrently processed is used herein to mean that the portion may simulated concurrently or software and/or hardware module is generated for deployment on a hardware platform that supports concurrent processing.

Exemplary embodiments can be applied to a time-based graphical model, a state-based graphical model, an entity-based graphical model or a combination thereof. Exemplary embodiments can also be applied to other types of graphical models, such as a dataflow graphical model.

Exemplary embodiments may partition patterns present in a model and perform concurrent processing using a multi-threaded, multi-core, or multi-processor system.

Selected embodiments may provide concurrent processing of at least a portion of a graphical model, where the portion includes a pattern among a set of patterns. Concurrent processing may be efficient when the graphical model has components that fit one of the identified patterns. The greater the number of patterns that can be identified in a model, the greater the number of opportunities to execute portions of the model concurrently, and thus, the greater performance improvement that may be achieved.

In this way, a time-based simulation environment, such as SIMULINK, can participate in the aforementioned identification of certain patterns, and may lead to a concurrent implementation of the time-based model.

In one embodiment, an intermediate representation (IR) of a graphical model may be used to recognize a pattern in the graphical model that is suitable for concurrent processing. One IR useful for this task is an in-memory graph-based representation of the block diagram. Nodes of the graph may be symbolic representations of activities such as computations to be performed on data, and may correspond to the blocks in the diagram. Edges of the graph (that is, interconnections among graph nodes) may represent input, output, or intermediate data results, utilized or produced by the nodes in the graph, and may represent lines connecting blocks in the original graphical model. Recognition of connectivity patterns in the graphical block diagram may be complicated by the presence of irrelevant attributes, such as color, shape, position, size, etc., of the blocks. In contrast, recognition of patterns in the IR is greatly simplified since irrelevant attributes are discarded or made to be easily ignored in the graph nodes. Traversal of graph nodes is also generally simplified in the IR, as compared to traversing a direct representation of an original graphical model. Also, the graph may be particularly tailored for use with another program that may assess collections of connected nodes to identify patterns of interest, and may permit simpler removal, replacement, extension, or transformation of the graph or subgraphs within the graph to yield a new graph.

Pattern templates may be produced and retained in-memory as small independent graphs of connected nodes, and in this way a library of pattern templates (motifs) may be stored in a compact form to be used during identification. As the IR corresponding to a model is compiled, each node of the IR is visited. At this time, each graph template in the library may be compared at the correct node to test for a match. Different nodes of the template graph can be selected for alignment to the current IR node for robust identification.

Techniques for matching a template graph to a larger graph are well-known and include heuristic search.

Figure 4:
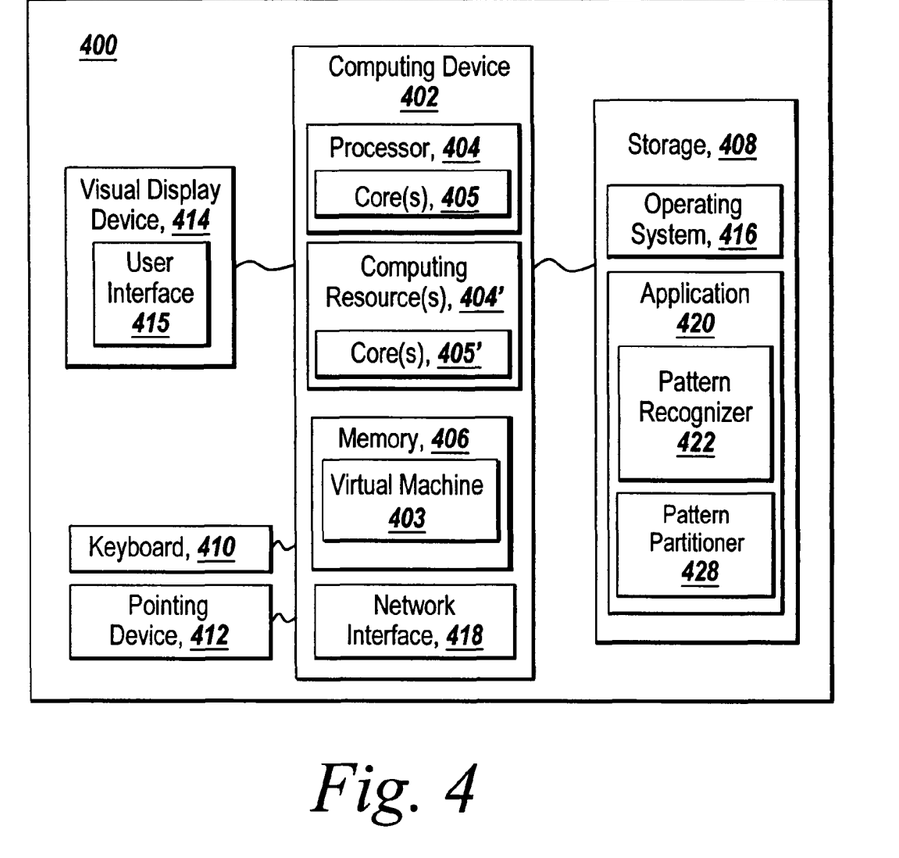
FIG. 4 is a block diagram of a computing device suitable for practicing an exemplary embodiment.
Figure 5:
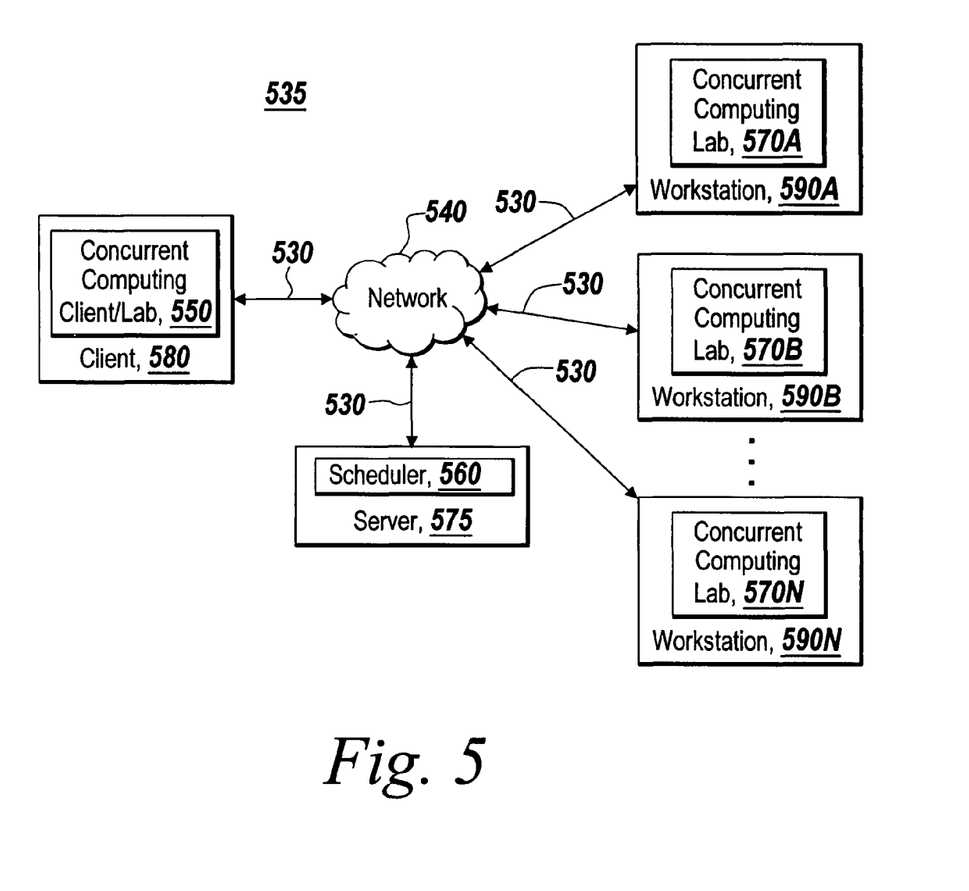
FIG. 5 is a block diagram of a concurrent computing system that may include more than one computing device.
Figure 6:
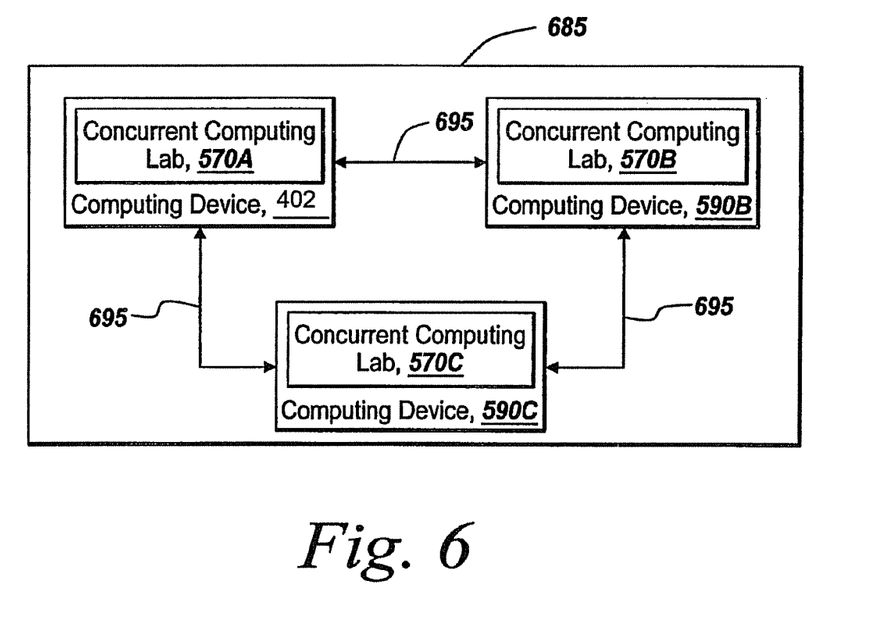
FIG. 6 illustrates a block diagram illustrating a collaboration of concurrent computing labs.

FIGS. 1A to 3B illustrate exemplary patterns that are suitable to be used as pattern templates. FIGS. 4 to 6 illustrate exemplary concurrent implementations of the patterns in FIGS. 1A to 3B.

Figure 1A:
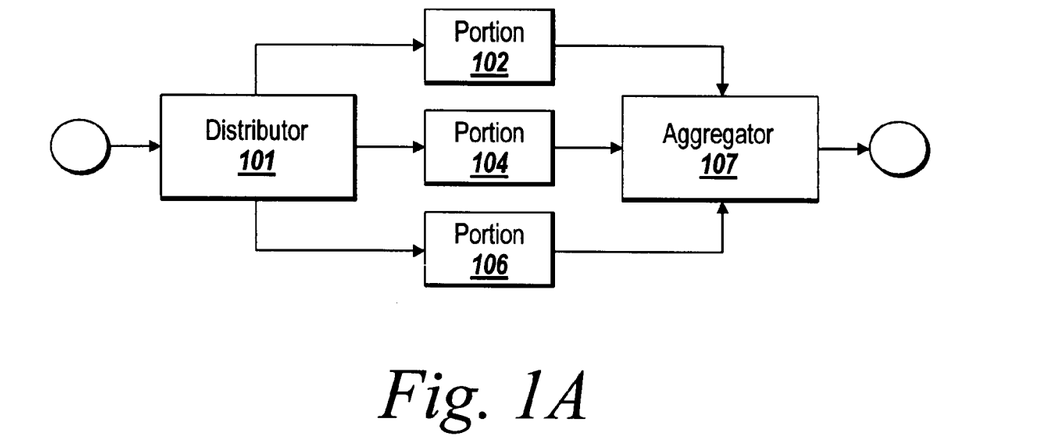
FIG. 1A illustrates an exemplary scatter and gather pattern that may be used to practice an exemplary embodiment.

FIG. 1A illustrates a so called "scatter and gather" pattern, where a distributor node 101 disseminates all or part of the input data to multiple graphical portions 102, 104, 106, which may use at least some common input data and perform independent processing on the data before the processing results are later gathered and collected together in an aggregation node 107. Although FIG. 1A shows three graphical portions 102, 104, and 106 of a model as an example, other number of graphical portions of a graphical model that are greater than one can also be employed. In a preferred embodiment, the portions 102, 104, and 106 are nodes in the IR, in which case the nodes may directly correspond to blocks in the graphical model, or may correspond to reductions, combinations, or general transformations of the original graphical blocks in whole or in part, such that one-to-one correspondence to original blocks may not exist.

Graphical portions 102, 104, and 106 can be concurrently processed. In this scatter/gather pattern, each of the portions 102, 104, and 106 may be assigned to be executed on different computing elements. The implementation of the different computing elements to which the portions 102, 104, and 106 may be assigned will be described below in more detail with reference to FIGS. 4-6.

Figure 1B:
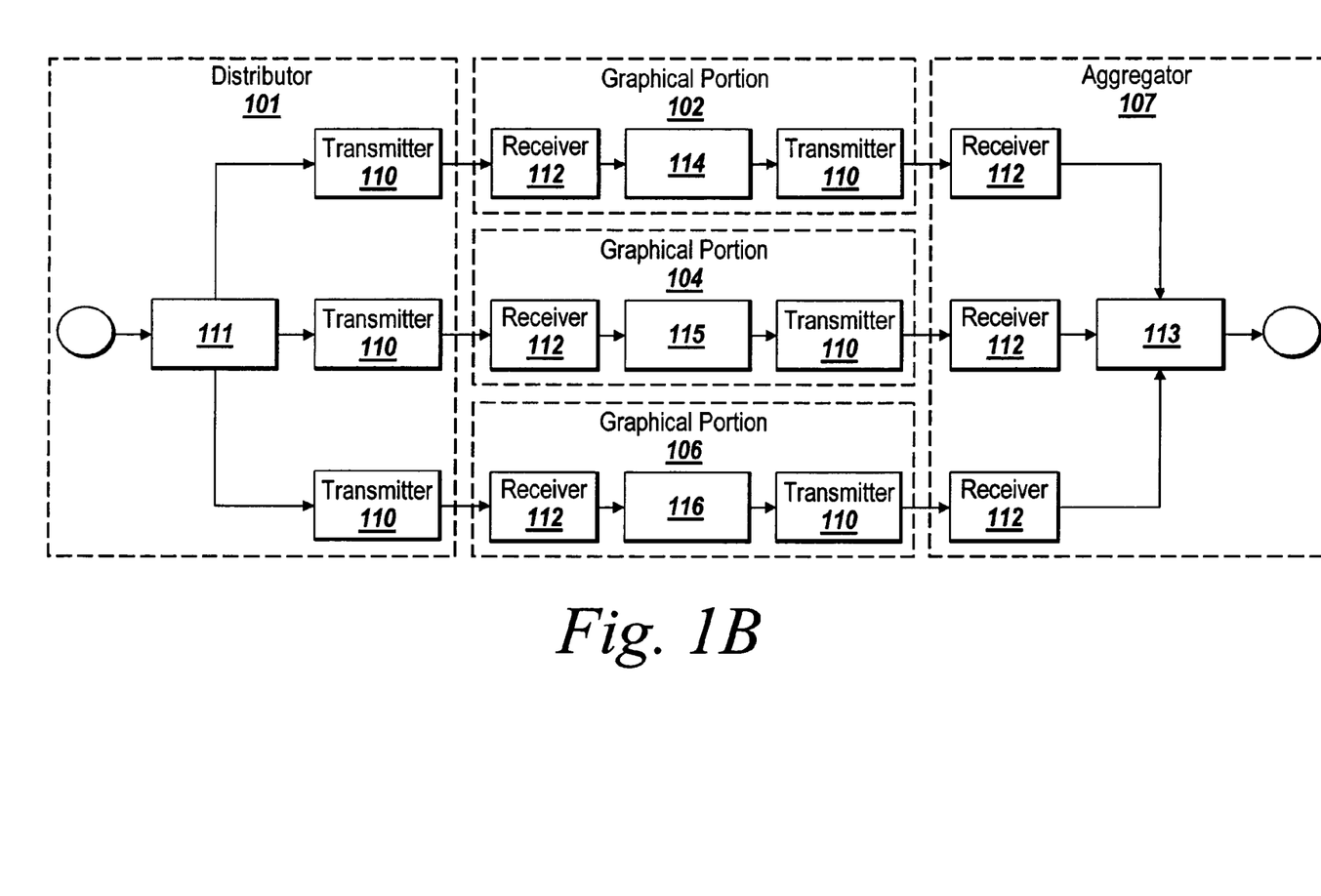
FIG. 1B illustrates an exemplary scatter and gather pattern that may be used to practice the exemplary scatter and gather pattern of FIG. 1A.

FIG. 1B illustrates the scatter-gather pattern in more detail. The distributor node 101 may include a node 111 that responds to input data and routes all or part of the data to each of a set of transmitters 110. The transmitters 110 may send data to the graphical nodes 102, 104 and 106, which include a receiver node 112, a processing node 114, 115 or 116, and a transmitter 110. The transmitters 110 for the graphical nodes 102, 104 and 106 may send data to an aggregator 107 which includes a set of receivers 112 and a node 113 that combines the data from the receivers 112. The data transmission may be achieved through copying the data into shared memory, sending the data over the Ethernet, or other means. The receivers 112 may obtain data by reading it from shared memory, listening to the Ethernet, or other appropriate means relevant to the transmission method.

The distribution node 101 and aggregation node 107 may perform their operations on the same computing element or separate computing elements. Likewise, the three graphical nodes 102, 104 and 106 may operate on three separate computing elements, or may share fewer resources.

Figure 2A:
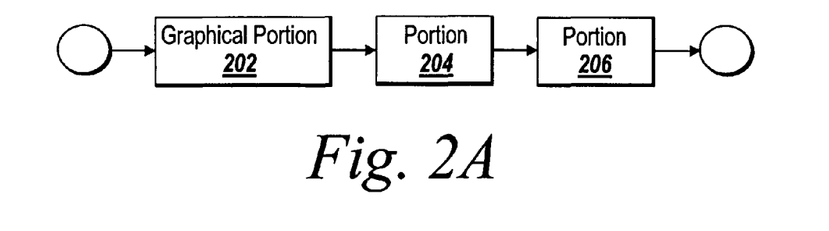
FIG. 2A illustrates an exemplary pipelining pattern that can be used to practice an exemplary embodiment.

FIG. 2A illustrates a so called "pipelining" pattern for a graphical model, where the division of computations is analogous to the division of labor in an assembly line. In the absence of concurrent processing, data available at the input to graphical portion 202 is processed first by graphical portion 202. The results are subsequently processed by graphical portion 204, and then finally by graphical portion 206. Assuming that this is a graphical time-based model, and that each graphical portion takes 1 time unit for computation, data available at time t at the input to graphical portion 202 will appear as processed data at the output of graphical portion 206 at time t+3 units. At this point, graphical portion 202 can then begin to process the second set of data available at time t+3, the results of which will appear at the output of graphical portion 206 at time t+5. If graphical portions 202, 204, and 206 can do concurrent processing, then at time t+1, graphical portion 202 will begin to process the second set of data values, and at time t+2, graphical portion 204 will begin to process the second set of data values. This ensures that at time t+4, results for the second set of data values are available at the output of graphical portion 206.

Figure 2B:
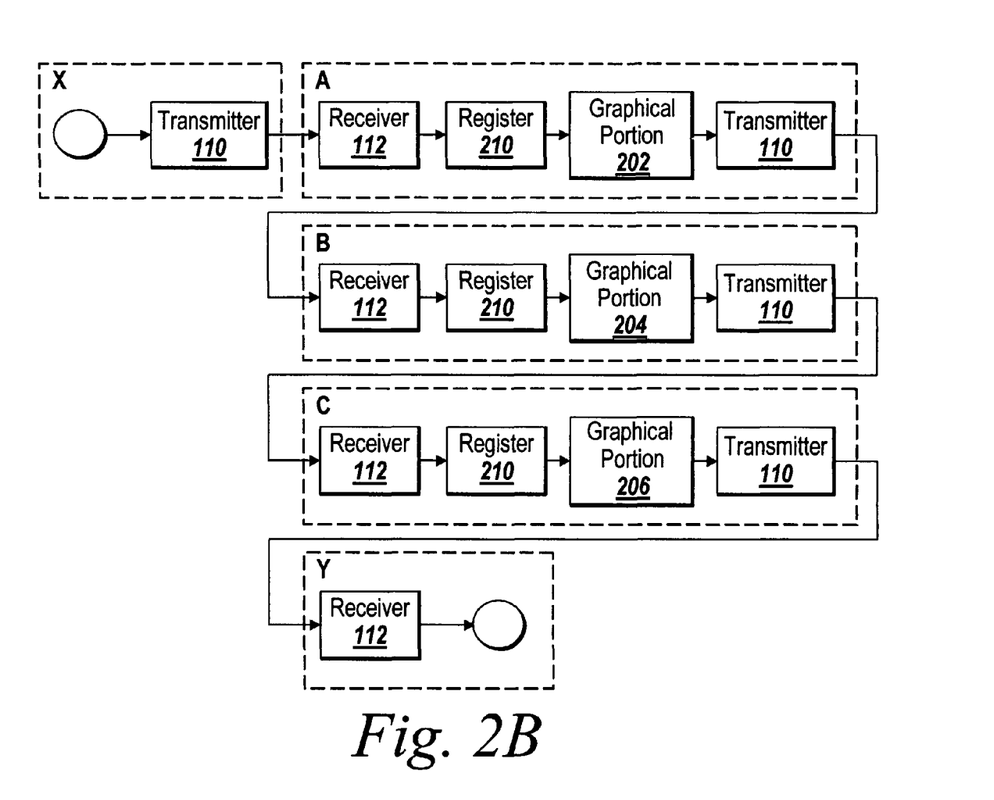
FIG. 2B illustrates an exemplary pipelining pattern that may be used to practice the exemplary pipelining pattern of FIG. 2A.

FIG. 2B illustrates the pipelining pattern in more detail. Transmitters 110 are used to transmit data for processing in graphical portions 202, 204, and 206. The graphical portions 202, 204 and 206 may be included in nodes A, B and C, respectively. The transmitters 110 are used to transmit data from node X to node A, from node A to node B, node B to node C, and node C to node Y. Receivers 112 are used to receive data in nodes A, B, C and Y. The data may be delayed or stored in register 210 in nodes A, B and C. This allows graphical portions 202, 204, and 206 to execute concurrently.

Although FIGS. 2A and 2B illustrate a pipelining pattern using three graphical portions, a pipelining pattern with any number of graphical portions more than one may be used.

Figure 3A:
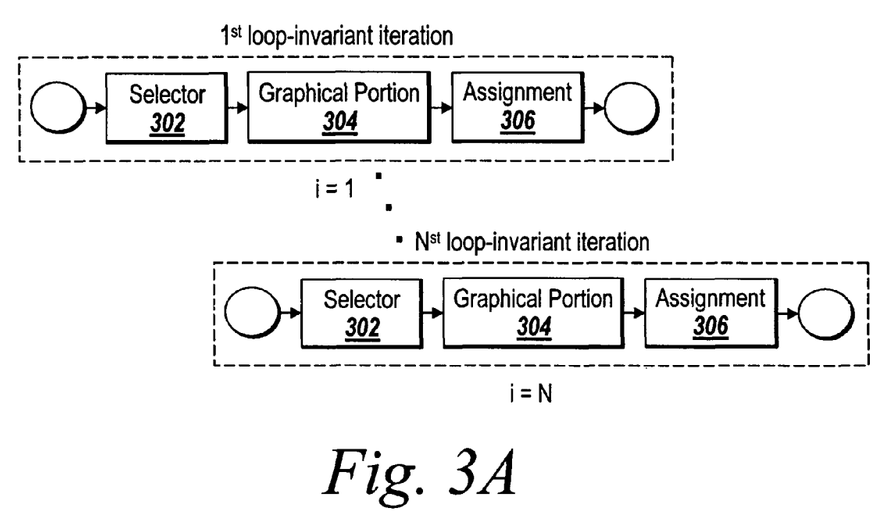
FIG. 3A illustrates an exemplary iteration pattern that can be used with an exemplary embodiment.

FIG. 3A illustrates a so called "iteration" pattern, where each iteration can be independently computed with respect to other iterations and in each iteration, the same computations or processing of data are carried out, although with some different data. Graphical portion 304 may represent the portion of a graphical model that may use iterations. Portions 302 represent Selectors that select the sub-portion of the original data to be processed through a given iteration. Portions 306 represent Assignments that assign back processed sub-portions of processed data to reconstitute the original data. Hence, if pattern recognizer (422 in FIG. 4) can recognize that there is an iteration pattern where each iteration can be independently computed, time can be saved by concurrently processing. Each of the graphical portions 304 may contain more than one graphical element from a graphical model.

Figure 3B:
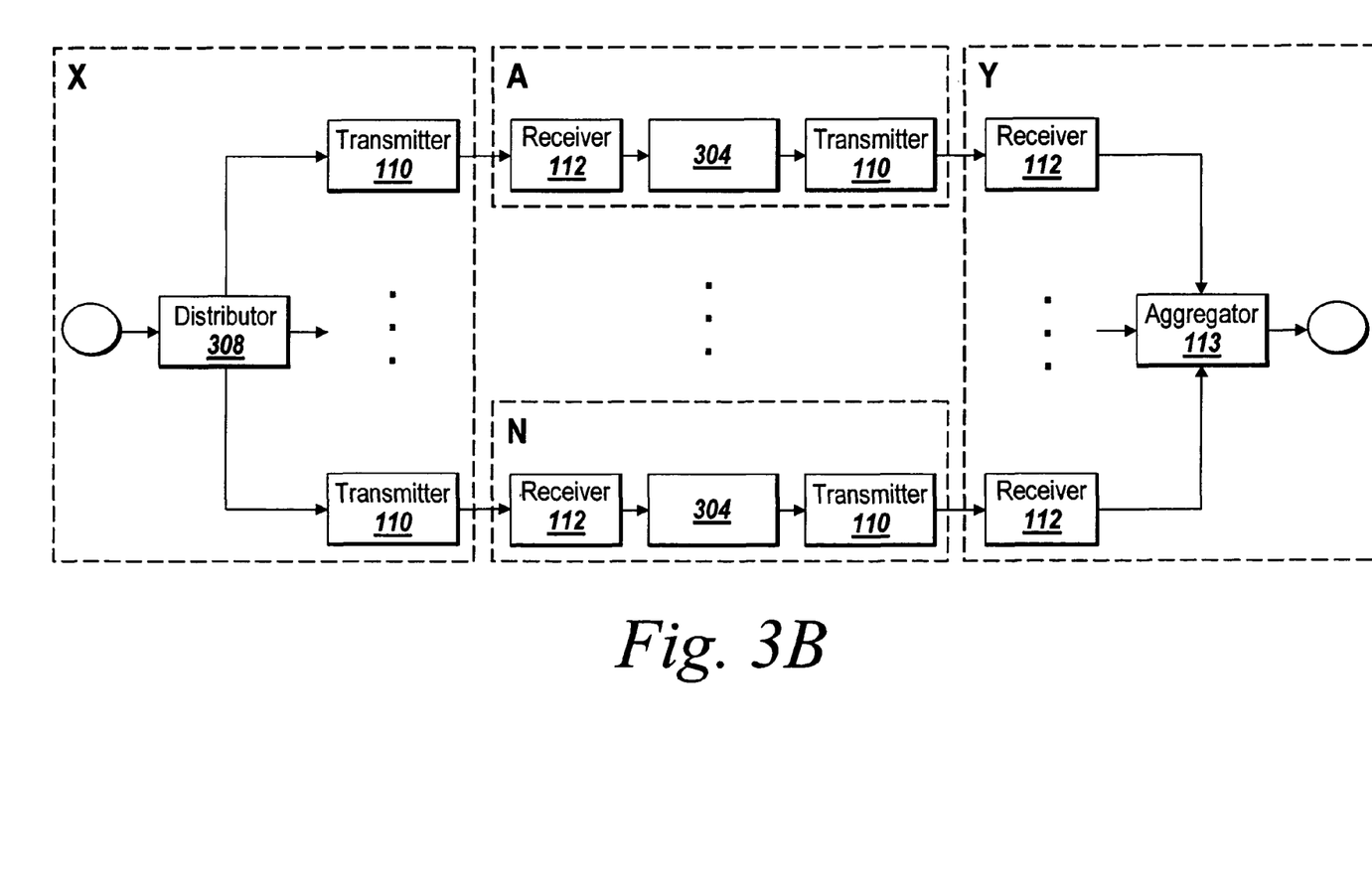
FIG. 3B illustrates an exemplary iteration pattern that may be used to practice the exemplary iteration pattern of FIG. 3A.

FIG. 3B illustrates the iteration pattern in more detail. Each iteration is performed concurrently on one of N different iterations. The original data is distributed to the N iterations by the distributor node 308. The distributor node 308 may distribute data for all iteration simultaneously. The distributed data is then transmitted to each concurrent iteration by transmitters 110. The processed data is transmitted back by receivers 112 and then reassembled by the reassembly block 310. The reassembly block 310 may aggregate results from all iterations synchronously.

FIG. 4 depicts an environment suitable for practicing an exemplary implementation. The environment 400 may include a computing device 402 having memory 406, on which software according to one embodiment, may be stored, processor 404, and optionally, one or more computing resource(s) 404' for executing software stored in the memory 406, and other programs for controlling system hardware. Processor 404 and computing resource(s) 404' may include a single core or multiple cores (405 and 405').

The term "multi-core" is used herein to refer to a computing resource that has multiple cores, where each core is a distinct and separably-operable processing node.

The term "multi-processor" is used herein to refer to multiple computing resources that are used to perform processing operations, such as processing operations related to a graphical model. For example, computing device 402 has both processor 404 and computing resource(s) 404' that can be used to process a graphical model built using application 420. The computing resources in a multi-processor environment do not need to be the same. In other words, computing device 402 may have a multi-processor environment even if computing resource 404' is not a processor.

The term "multi-thread" is used herein to refer to an environment that supports multiple parallel paths of execution.

The memory 406 may include a computer system memory or random access memory such as dynamic random access memory (DRAM), static random access memory (SRAM), extended data output random access memory (EDO RAM), etc. The memory 406 may include other types of memory as well, or combinations thereof. A user may interact with the computing device 402 through a visual display device 414 such as a computer monitor, which may include a user interface 415. The computing device 402 may include other I/O devices such a keyboard 410, a pointing device 412, such as a mouse, for receiving input from a user. Optionally, the keyboard 410 and the pointing device 412 may be connected to the visual display device 414. The computing device 402 may include other suitable conventional I/O peripherals. The computing device 402 may further comprise a storage device 408, such as a hard-drive, CD-ROM, or other computer readable media, for storing an operating system 416 and other related software, and for storing application 420.

A graphical model implemented using application 420 can be executed using multi-thread, multi-core, or multi-processor computing techniques and/or devices. Application 420 can include a pattern recognizer 422 for detecting a pattern in the graphical model that is suitable for concurrent processing. Application 420 can also include pattern partitioner 428 for partitioning the pattern in the graphical model that is recognized by pattern recognizer 422. One of ordinary skill in the art will appreciate that pattern recognizer 422 and pattern partitioner 428 can be adapted to be included as part of the application 420, or they can each be a stand-alone application/module/script/program that responds to calls from the application 420.

Additionally, the operating system 416 and application 420 can be run from a computer readable media, such as, for example, KNOPPIX®, a bootable CD for GNU/Linux.

The computing device 402 may include a network interface 418 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 418 may comprise a built-in network adapter, network interface card, personal computer memory card international association (PCMCIA) network card, card bus network adapter, wireless network adapter, USB network adapter, modem or any other device suitable for interfacing the computing device 402 to any type of network capable of communication and performing the operations described herein. Moreover, the computing device 402 may be any computer system such as a workstation, desktop computer, server, laptop, handheld computer or other form of computing or telecommunications device that is capable of communication and that has sufficient processor power and memory capacity to perform the operations described herein.

The computing device 402 can run substantially any operating system, such as any of the versions of the Microsoft® Windows® operating systems, the different versions of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Virtualization can be employed in computing device 402 so that infrastructure and resources in the computing device can be shared dynamically. Virtualized processors may also be used with application 420 and other software in storage 408. A virtual machine 403 can be provided to handle a process running on multiple processors so that the process appears to be using only one computing resource rather than multiple. Multiple virtual machines can also be used with one processor. Other computing resources, such as Field Programming Gate Array (FPGA), Application Specific Integrated Circuit (ASIC), Application Specific Instruction Processor (ASIP), Digital Signal Processor (DSP), and General Purpose Processor (GPP), may also be used for executing code and/or software. A hardware accelerator, such as implemented in an ASIC, FPGA, or the like, can additionally be used to speed up the general processing rate of the computing device 402.

FIG. 5 depicts a concurrent computing system 535 that is suitable for practicing the illustrative embodiment of the present invention. In brief overview, the system 535 can include a concurrent computing client 550 running on a client 580, concurrent computing labs 570A-N on workstations 590A-N, and optionally a server 575.

A concurrent computing lab is a process, such as an instance of an application, executing on a computing resource where the process performs distributed computing or parallel computing.

A computing resource can be, but not limited to, a processor, a computer system, GPP, DSP, FPGA, ASIC, or other hardware with computational capabilities, such as instruments for data acquisition (oscilloscopes, waveform generators, etc.). Each computing resource may have a single core or multiple core. For a multi-core computing resource, it can further be a homogeneous multi-core, such as Intel Centrino Duo dual-core processor, or a heterogeneous multi-core, such as a TI OMAP processor that has an ARM core and a C5000 DSP core or a Silinx Virtex-2 FPGA with 1 to 4 PowerPC processor cores.

More than one concurrent computing lab can be run on a single computing resource and each concurrent computing lab can be on a different thread or a different core. More than one concurrent computing lab can also be run on a single core of a computing resource, where each concurrent computing lab can be on a different thread. The concurrent computing client 550 is in communication with the concurrent computing labs 570A-N and server 575 through network communication channels 530 over a network 540. One of ordinary skill in the art will appreciate that workstations 590A-N, server 575, and client 580 may have one or more concurrent computing lab. Each of the concurrent computing labs 570A-N is an instance of the application 420.

The concurrent computing client 550 can be a technical or non-technical computing software application. Concurrent computing client 550 may provide a technical computing and/or graphical modeling environment for generating block diagram models and to define mathematical algorithms for simulating models. The concurrent computing client 550 may include all or a portion of the functionality provided by the application 420. Furthermore, the concurrent computing client 550 can be a custom software program or other software that accesses functionalities of application 420 via an interface, such as an application programming interface (API), or by other means. One of ordinary skill in the art will appreciate the various combinations of client types that may access the functionalities of the system.

In one embodiment of the present invention, concurrent computing client 550 is also a concurrent computing lab. In such a configuration, communication channels are set up among the concurrent computing labs (concurrent computing client 550 and concurrent computing labs 570A-N). Each of the concurrent computing labs (including the concurrent computing client 550) has its local copy of a computer program that is executed in the corresponding concurrent computing labs, so there is no main concurrent computing lab that distributes executions to the other concurrent computing labs.

Alternatively, a copy of the computer program can be accessed through a network connection. The local copy of the program for each lab may or may not be identical. The concurrent computing client 550 can additionally have the functionality to accept inputs and/or commands from a user related to the computer program using a tool such as an Integrated Development Environment (IDE). The concurrent computing client 550 and concurrent computing labs 570A-N can be configured to perform distributed computing or parallel computing.

In one embodiment of the present invention, functions can be defined, by the concurrent computing client 550 with an application programming interface (API) and/or programming language, representing a technical computing task to be executed by either a technical computing environment local to the client 580, or remote on the workstations 570A-N. Tasks can be declared on a concurrent computing client 550 and additionally organized into jobs. A job is a logical unit of activities, or tasks that are processed and/or managed collectively. A task defines a technical modeling computing command to be executed, and the number of arguments and any input data to the arguments. Each job can include one or more tasks.

In one aspect of the present invention, a task can be directly distributed by the concurrent computing client 550 to one or more computing resources, such as workstations 590A-N. A computing resource performs technical computing on a task and may return a result to the concurrent computing client 550.

In another aspect of the present invention, the system may include a server 575 on which a scheduler 560 runs. The scheduler 560 can be a scheduler provided with application 420, a generic scheduler, or a third-party scheduler that is designed and provided by a company or individual that may not provide application 420.

For example, if application 420 is parallel computing with MATLAB® by The MathWorks, Inc. of Natick, Mass., a third-party scheduler can be MPI Exec, LSF, Condor, Microsoft Compute Cluster Server, or PBS. The server 575 communicates over a network communication channel 530 on the network 540 to the workstations 590A-N. One of ordinary skill in the art will appreciate that any of the workstations 590A-N may include more than one technical computing lab to practice the present invention. Additionally, client 580 and server 575 may also include one or more concurrent computing labs.

The scheduler 560 comprises one or more application software components to provide for the automatic distribution of tasks from the concurrent computing client 550 to one or more of the concurrent computing labs 570A-N. The scheduler 560 allows the concurrent computing client 550 to delegate the management of task distribution to the scheduler 560. The scheduler may also set up for concurrent computing client 550 the concurrent computing labs 570A-N by using the information received from the concurrent computing client 550 regarding the number of concurrent computing labs needed and other configuration information.

Hence, the concurrent computing client 550 may not need to know the specifics of the concurrent computing labs 570A-N. The concurrent computing client 550 can define a function to submit the task to the scheduler 560, and get a result of the execution of the task. As such, the scheduler 560 provides a level of indirection between the concurrent computing client 550 and the concurrent computing labs 570A-N.

The use of a scheduler eases the distributed programming and integration burden on the concurrent computing client 550. The concurrent computing client 550 may not need to have prior knowledge of the availability of the workstations 590A-N. For multiple task submissions from the concurrent computing client 550, the scheduler 560 can manage and handle the delegations of the tasks to the concurrent computing labs 570A-N and hold the results of the tasks on behalf of the concurrent computing client 550 for retrieval after the completion of technical computing of all the tasks distributed by concurrent computing client 550 or at desired intermediate points.

In an alternative implementation, the concurrent computing labs 570A-N may provide concurrent computing client 550 directly the results of the tasks assigned to concurrent computing labs 570A-N by the scheduler 560. The scheduler 560 can further include an object-oriented interface to provide control of delegating tasks and obtaining results in the system 535. The scheduler 560 also provides an interface for managing a group of tasks collectively as a single unit called a job, and on behalf of a concurrent computing client 550, submitting those tasks making up the job, and obtaining the results of each of the tasks until the job is completed.

One of ordinary skill in the art will recognize that the functions and operations of the scheduler 560 can be separated into various software components, applications and interfaces. Additionally, the functions and operations of the scheduler 560 may reside on either the concurrent computing client 550 or one of the concurrent computing labs 570A-N instead of the server 575.

Additionally, each of the client 580, the server 575, and the workstations 590A-N can be running the same or different operating systems with the same or different processors. For example, the client 580 can be running Microsoft® Windows®; the server 575 can be running a version of Unix, and the workstations 590A-N a version of Linux. Alternatively, each of the client 580, the server 575 and the workstations 590A-N can be running Microsoft® Windows®.

One of ordinarily skill in the art will recognize the various combinations of operating systems and processors that can be running on any of the computing devices (client 580, server 575, workstations 590A-N). One or ordinary skill in the art will also appreciate that some computing devices may not have or require an operating system. For example, an FPGA, that may operate without an operating system, can be configured to perform computations synchronously and/or asynchronously and may place the data on a communication bus and/or other type of device and/or interface.

FIG. 6 illustrates a collaboration of the concurrent computing labs 570A, 570B, and 570C. The concurrent computing labs 570A, 570B, and 570C establish a communication channel 695 and form a collaboration 685. The concurrent computing labs 570A, 570B, and 570C may communicate via a communication channel 695. In one embodiment of the present invention, message passing interface (MPI) may be used to communicate over the communication channel 695.

In other embodiments, the concurrent computing labs 570A, 570B, and 570C can interface via socket based communications over TCP/IP implementing a custom message specification. In further embodiments, the concurrent computing labs 570A, 570B, and 570C may communicate using any available messaging communications products and/or custom solutions that allow the sending and receiving of messages among the concurrent computing labs 570A, 570B, and 570C.

In certain embodiments, the communication channel 695 may include a file interfacing mechanism such as reading and writing to files on a network accessible directory or common file system. Furthermore, the concurrent computing labs 570A, 570B, and 570C can each be waiting or listening for messages from other concurrent computing labs 570A, 570B, and 570C.

One of ordinary skill in the art will recognize the various types of interfaces to communicate messages among the concurrent computing labs 570A, 570B, and 570C. The communication among the concurrent labs 590A-C may be done over a bus using interfaces such as PCMCI, Flexray, Firewire, RS-232.

In one embodiment of the present invention, the collaboration is dynamic. In other words, a user can modify or change the size of the collaboration by adding another computing resource. The user may be provided on the client 580 with a user interface to modify or change the size of the collaboration or designate a specific resource to add or remove from the collaboration. In another embodiment of the present invention, the client 580 can forward the information to the scheduler 560, which will determine a concurrent computing lab to be added or removed from the collaboration.

Figure 7:
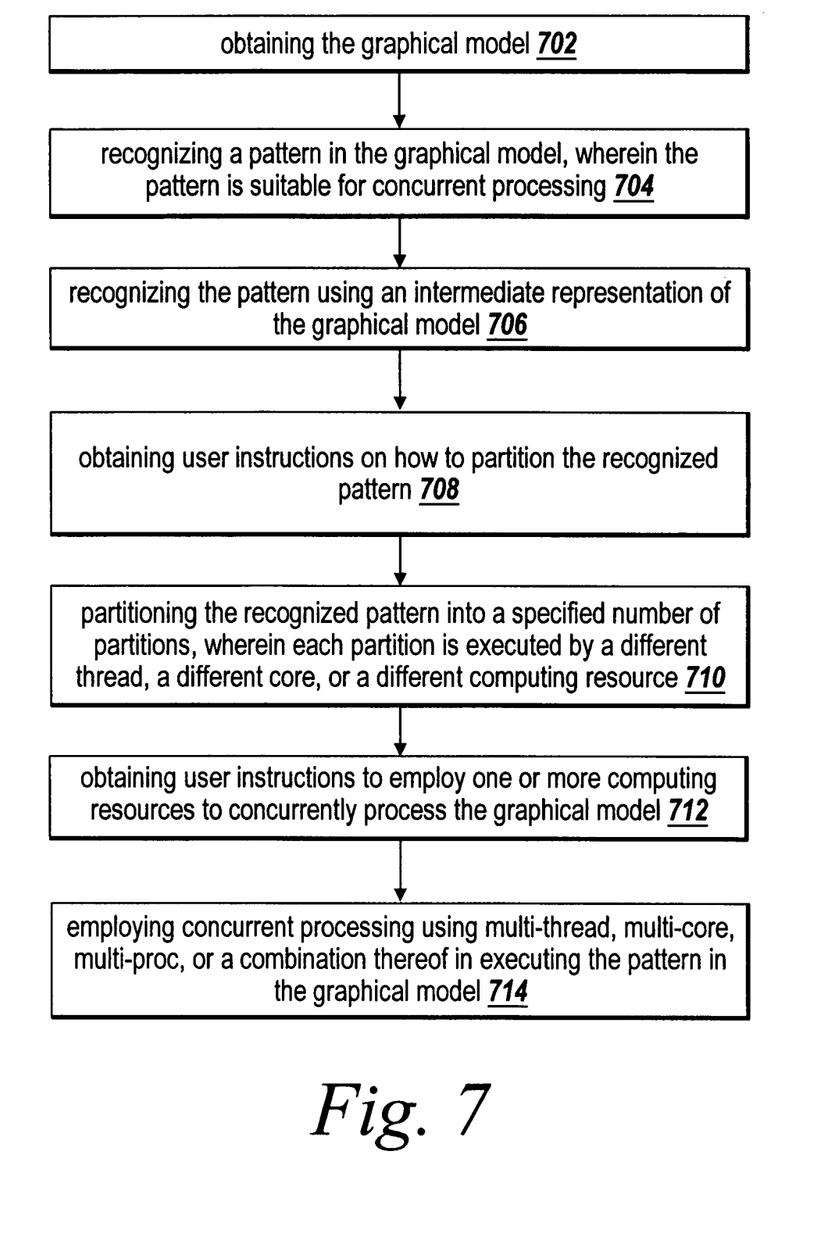
FIG. 7 illustrates a flowchart depicting exemplary processing that can be performed when a pattern suitable for concurrent processing is recognized.

FIG. 7 shows a flowchart depicting steps taken to practice one exemplary embodiment. In step 702, a graphical model is obtained by application 420. The graphical model can be provided by a user or read from a file stored in storage 408. The graphical model can be but is not limited to a time-based graphical model, such as Simulink®, a state-based graphical model, such as Stateflow®, an entity-based graphical model, such as SimEvent™, etc. or a combination thereof. The graphical model can optionally include one or more dataflow components. The dataflow component may be a synchronous dataflow component.

Dataflow may refer to a programming method where the execution of a particular program is triggered by the availability of data to all inputs of the particular program. For example, in a graphical programming language that implements a dataflow, the program and/or model may include boxes with inputs and/or outputs. The program/model may further include arrows between the boxes, where the arrows indicate a flow of the input and output data. The boxes may run when inputs used by a box become valid and not having to wait for the program to encounter the boxes.

Dataflow components can be used to model a dataflow program as a directed graph of data flowing between operations. When all inputs are available in a dataflow component, execution of the dataflow component may begin and may continue until a termination signal is encountered. Unlike other programs, such as a time-based program or an event-based program, execution of all elements in a dataflow component does not stop or pause somewhere in the middle of the execution before resuming execution.

LabVIEW® is an example of a software program that utilizes a dataflow environment; however it is an asynchronous dataflow program. In an asynchronous dataflow program, inputs are not available at the same time; hence one cannot predict when execution of the dataflow components will start. In an exemplary embodiment, the dataflow components are synchronous dataflow components. In a synchronous dataflow component, data flow is scheduled so that the flow of control is completely predictable at compile time. In other words, inputs would be available at the time when the synchronous dataflow component is scheduled to be executed.

Referring still to FIG. 7, in step 704 the pattern recognizer 422 may inspect the graphical model and recognize a pattern in the graphical model, where the pattern is suitable for concurrent processing. In an exemplary embodiment, one or more elements in the dataflow components form the recognized pattern. The pattern can be a scatter and gather pattern, a pipelining pattern, an iteration pattern, or a combination thereof. FIGS. 1A-3B illustrates different patterns that are suitable for concurrent processing. The pattern recognizer 422 may optionally recognize the pattern at compile time of the graphical model. The pattern recognizer 422 may also optionally use an intermediate representation of the graphical model to find the recognized pattern in step 706.

In step 708, user instructions may be optionally obtained regarding how to partition the recognized pattern. In step 710, pattern partitioner 428 may partition the recognized pattern automatically or may partition based on user instructions, where each partition may be executed by a different thread, a different core, or a different computing resource.

In one aspect, the pattern partitioner 428 partitions the recognized pattern based on computational power of one or more computing resources used in concurrent processing of the pattern in the graphical model. Pattern partitioner 428 can partitions the recognized pattern into a determined number of partitions.

In another aspect, pattern partitioner 428 may partition the recognized pattern based on user instructions. A user may specify a number of partitions or the pattern partitioner 428 may partition the pattern based on available resources, computational requirements of each graphical portion in the pattern, and/or other information.

For example, given a scatter and gather pattern like that in FIG. 1A that is recognized by the pattern recognizer 422 and given two threads that can be used to perform concurrent processing, pattern partitioner 428 may decide to use one thread to execute graphical portions 102 and 104 and another thread to execute graphical portion 106 given that graphical portion 106 takes the longest to process among the three graphical portions 102, 104, and 106.

In another example, if three computing resources are available and a scatter and gather pattern like that in FIG. 1A is recognized, the pattern partitioner 428 may assign each computing resource with a graphical portion. Alternatively, the pattern partitioner 428 may partition graphical portions 102 and 104 into one partition and assign them to one computing resource. The other two computing resources are assigned to share the processing of graphical portion 106, since graphical portion 106 may take the longest to process among the three graphical portions.

Referring still to FIG. 7, user instructions optionally may be obtained regarding one or more computing resources that can be used to employ concurrent processing of the graphical model in step 712. User instructions can include which partition should be assigned to which computing resource or what type of concurrent processing would be employed, either multi-thread, multi-core, multi-processor, or a combination thereof. For each partition, code is generated to fit the corresponding computing resource. The right I/O (input/output) driver, the right API (application programming interface), the memory needed and other materials need to be prepared for each computing resource so that concurrent processing can be realized.

Although concurrent processing has overhead in obtaining the proper driver, the interface, or in performing other preparation work, a lot of time can still be save if the graphical model is complex and/or large enough for execution. Finally, in step 714, concurrent processing is employed using multi-thread, multi-core, multi-processor, or a combination thereof in executing the pattern part of the graphical model.

Exemplary embodiments are described for illustrative purposes relative to a Simulink®-compatible modeling environment that enables a graphical model to be built and/or executed. A SIMULINK-compatible modeling environment provides means (e.g., via hardware or software based logic) to use a SIMULINK model and/or features in the SIMULINK-compatible modeling environment. For example, a SIMULINK-compatible modeling environment may provide means to interface with a SIMULINK model, means for importing or exporting a SIMULINK model, means for translating a SIMULINK model, means for integrating a SIMULINK model, etc. Although exemplary embodiments may be described relative to a SIMULINK-compatible modeling environment, the present invention is not limited to these embodiments and may be applied to graphical modeling and/or computing tasks via other graphical modeling environments.

Further examples of graphical modeling environments that may be used to develop and/or execute a graphical model in accordance with exemplary embodiments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTi- SAN Software Tools, Inc., SCADE™ from Esterel Technologies, Inc., and a Unified Modeling Language (UML) environment, among others.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 7, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 4-6 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

We claim:

1. A computer-implemented method for concurrently processing at least a portion of a graphical model including a plurality of blocks and connections among the plurality of blocks, said method comprising:
    storing the graphical model in a memory;
    identifying a group of interconnected blocks from the plurality of blocks of the graphical model stored in the memory, the group of interconnected blocks including connections among the group of interconnected blocks;
    comparing the group of interconnected blocks and the connections among the group of interconnected blocks with predetermined connectivity patterns, where the predetermined connectivity patterns include sets of blocks interconnected in particular ways that are suitable for concurrent processing, and wherein the sets of blocks of the predetermined connectivity patterns include a first block configured to transmit data to a second block; and
    if the group of interconnected blocks and the connections among the group of interconnected blocks match a given predetermined connectivity pattern of the predetermined connectivity patterns, concurrently executing, by a multiprocessor system coupled to the memory, the group of interconnected blocks during execution of the at least a portion of the graphical model.

2. The computer-implemented method of claim 1 wherein the given predetermined connectivity pattern is selected from the group consisting of an iteration pattern, a scatter/gather pattern, and a pipeline pattern.

3. The computer-implemented method of claim 1 further comprising:
    generating code for the graphical model having concurrently executable components, wherein at least one of the concurrently executable components of the generated code is an execution thread.

4. The computer-implemented method of claim 1 further comprising:
    receiving at least one user-specified constraint; and
    applying the at least one user-specified constraint to identify one or more concurrently executable portions of the graphical model.

5. The computer-implemented method of claim 1 wherein the graphical model includes a dataflow diagram.

6. The computer-implemented method of claim 1 wherein the graphical model conforms to a Unified Modeling Language (UML).

7. An apparatus comprising:
    a memory storing a graphical model including a plurality of blocks and connections among the plurality of blocks; and
    a multiprocessor system coupled to the memory, the multiprocessor system configured to:
        identify a group of interconnected blocks, from the plurality of blocks, the group of blocks including connections among the group of interconnected blocks;
        compare the group of interconnected blocks and the connections among the group of interconnected blocks with predetermined connectivity patterns, where the predetermined connectivity patterns include sets of blocks interconnected in particular ways that are suitable for concurrent processing, and wherein the sets of blocks of the predetermined connectivity patterns include a first block configured to transmit data to a second block; and
        if the group of interconnected blocks and the connections among the group of interconnected blocks match a given predetermined connectivity pattern of the predetermined connectivity patterns, concurrently execute the group of interconnected blocks during execution of the graphical model.

8. A system comprising:
    a memory storing a graphical model including a plurality of interconnected blocks;
    a processor configured to:
        compare, from the plurality of interconnected blocks of the graphical model, a group of interconnected blocks with predetermined connectivity patterns, where the predetermined connectivity patterns include sets of blocks interconnected in particular ways that are suitable for concurrent processing, and wherein the sets of blocks of the predetermined connectivity patterns include a first block configured to transmit data to a second block;
        partition the group of interconnected blocks into a plurality of partitions for concurrent processing when a match is identified between the group of interconnected blocks and a given predetermined connectivity pattern of the predetermined connectivity patterns; and
        cause the plurality of partitions to be processed concurrently by one or more computing resources during execution of the graphical model.

9. The system of claim 8 wherein the one or more computing resources is at least one of a multi-core computing resource and a multi-processor computing resource.

10. The system of claim 8 wherein the given predetermined connectivity pattern is selected from the group consisting of an iteration pattern, a scatter/gather pattern, and a pipeline pattern.

11. The system of claim 8 further comprising: a code generator configured to generate code for the graphical model having concurrently executable components, wherein at least one of the concurrently executable components of the generated code is an execution thread.

12. The system of claim 8 wherein the processor is further configured to receive at least one user-specified constraint, and to apply the at least one user-specified constraint to identify one or more concurrently executable portions of the graphical model.

13. The system of claim 8 wherein the graphical model includes a dataflow diagram.

14. The system of claim 8 wherein the graphical model conforms to a Unified Modeling Language (UML).

15. A non-transitory computer-readable medium comprising instructions executable by one or more data processing entities, the medium comprising:
   instructions to receive a graphical model including a plurality of blocks and connections among the plurality of blocks;
   instructions to create an intermediate representation (IR) of the graphical model, the IR having:
      a plurality of nodes that correspond to the plurality of blocks of the graphical model and
      edges among the plurality of nodes that correspond to the connections among the plurality of blocks;
   instructions to identify a group of nodes, from the plurality of nodes of the IR of the graphical model, and the edges among the group of nodes;
   instructions to compare the group of nodes and the edges among the group of nodes with one or more predetermined concurrency patterns, where the predetermined concurrency patterns include sets of nodes interconnected in particular ways utilizing edges that are suitable for concurrent execution, and wherein the sets of nodes of the predetermined concurrency patterns include a first node configured to transmit data to a second node; and
   instructions to generate code for the graphical model, where the generated code for the graphical model includes concurrently executable components that execute concurrently and that correspond to the group of nodes identified in the IR of the graphical model if the group of nodes and the edges among the group of nodes match a given predetermined concurrency pattern of the one or more predetermined concurrency patterns.

16. The non-transitory computer-readable medium of claim 15 wherein the generated code comprises code executable on a target machine.

17. The non-transitory computer-readable medium of claim 16 wherein the target machine comprises a multicore processor.

18. The non-transitory computer-readable medium of claim 15 wherein the one or more predetermined concurrency patterns include an iteration pattern, a scatter/gather pattern, and a pipeline pattern.

19. The non-transitory computer-readable medium of claim 15 wherein at least one of the concurrently executable components of the generated code is an execution thread.

20. The non-transitory computer-readable medium of claim 15 wherein the IR is one or more of a control flow graph (CFG) and a control-data flow graph (CDFG).

21. The non-transitory computer-readable medium of claim 15 further comprising instructions to perform at least one transformation on the IR before the instructions to compare the group of nodes and the edges among the group of nodes.

22. The non-transitory computer-readable medium of claim 21 wherein the at least one transformation is a reduction operation.

23. The non-transitory computer-readable medium of claim 15 further comprising:
   instructions to receive at least one user-specified constraint; and
   instructions to apply the at least one user-specified constraint to identify the group of nodes.

24. The computer-readable medium of claim 15 further comprising instructions to simulate the concurrent execution of the graphical model on a host machine.

25. The non-transitory computer-readable medium of claim 15 further comprising:
   instructions to receive a specification of a target hardware platform; and
   instructions to conform the concurrently executable components to a format matching the specification of the target hardware platform.

26. The non-transitory computer-readable medium of claim 25 wherein the target hardware platform includes one or more selected from the group comprising: field programmable gate arrays (FPGAs), digital signal processors (DSPs), graphic processing units (GPUs), application specific integrated circuits (ASICs), application specific instruction processors (ASIPs), processors, and cores.

27. The non-transitory computer-readable medium of claim 15 wherein the graphical model includes a dataflow diagram.

28. The non-transitory computer-readable medium of claim 15 wherein the graphical model conforms to a Unified Modeling Language (UML).

* * * * *